United States Patent [19]

Berdut

[11] Patent Number: 5,584,367
[45] Date of Patent: Dec. 17, 1996

[54] PERMANENT MAGNET TYPE AUTOMOTIVE VEHICLE SUSPENSION

[76] Inventor: Elberto Berdut, Orquidea No. 98, Santa Maria, Guaynabo, Puerto Rico, 00926

[21] Appl. No.: 398,171

[22] Filed: Mar. 2, 1995

Related U.S. Application Data

[63] Continuation-in-part of Ser. No. 392,247, Feb. 22, 1995, which is a continuation-in-part of Ser. No. 184,440, Jan. 21, 1994, Pat. No. 5,452,663, which is a continuation-in-part of Ser. No. 45,863, Apr. 14, 1993, Pat. No. 5,431,109.

[51] Int. Cl.$^6$ ........................................... B60L 13/10
[52] U.S. Cl. .................... 188/267; 104/283; 104/286; 104/290; 104/294
[58] Field of Search .................... 104/281, 283, 104/284, 286, 290, 292, 294; 318/135; 310/12, 13, 14, 127, 128, 129, 152, 154, 155, 156; 188/267, 284

[56] References Cited

U.S. PATENT DOCUMENTS

| | | | |
|---|---|---|---|
| 3,791,309 | 2/1974 | Baermann | 104/283 |
| 3,885,504 | 5/1975 | Baermann | 104/283 |
| 3,895,585 | 7/1975 | Schwarzler | 104/290 |
| 3,899,979 | 8/1975 | Godsey, Jr. | 104/283 |
| 4,148,260 | 4/1979 | Minovitch | 104/283 |
| 4,151,447 | 4/1979 | Von Der Heide et al. | 104/290 |
| 4,307,668 | 12/1981 | Vinson | 104/281 |
| 4,641,065 | 2/1987 | Shibuki et al. | 310/13 |
| 4,711,182 | 12/1987 | Alexandrov et al. | 104/283 |
| 5,072,144 | 12/1991 | Saito et al. | 310/12 |
| 5,165,347 | 11/1992 | Wagner | 104/283 |
| 5,293,969 | 5/1994 | Yamaoka et al. | 188/267 |
| 5,343,811 | 9/1994 | Schuster | 104/284 |

OTHER PUBLICATIONS

"Ceramic 5 Magnets–Typical Ceramic 5 Magnetic Material Characteristics", How to Order Sheet, Prior to Mar. 2, 1995, 104/286 General Information–Standard Magnets, pp. 3–6.
"NMI Notes", U.S. Department of Transportation, Federal Railroad Administration, U.S. Army Corps of Engineers, U.S. Department of Energy, No. 7, Nov. 1992, Maglev.

*Primary Examiner*—S. Joseph Morano
*Attorney, Agent, or Firm*—Ronald P. Kananen

[57] ABSTRACT

The invention relates to a magnetic unit used as a shock absorber or load leveler for a vehicle and having a plurality of groups of permanent magnets such as ceramic or ferrous magnets arranged in a side-by-side relationship, each plurality being separated from an adjacent plurality by a magnetically permeable member, such as a malleable steel member or a malleable iron or molded iron member to focus the lines of magnetic flux. Preferably, each of the permanent magnets within a group is also separated by an interleaved sheet of magnetically permeable material. Such a plurality of groups of permanent magnets are secured together to form a channel therebetween in which a supporting member is connected through fastening members to a movable levitated member which in turn is connected to the axle of the vehicle.

9 Claims, 1 Drawing Sheet

PERMANENT MAGNET TYPE AUTOMOTIVE VEHICLE SUSPENSION

This Application is a continuation-in-part of application Ser. No. 08/392,247 filed on Feb. 22, 1995, which is a continuation-in-part of the applicant's prior application, Ser. No. 08/184,440 filed on Jan. 21, 1994, now U.S. Pat. No. 5,452,663, which in turn is a continuation-in-part of Ser. No. 08/045,863, filed on Apr. 14, 1993, now U.S. Pat. No. 5,431,109.

BACKGROUND OF THE INVENTION

This invention relates to a movable vehicle, such as an automobile, which uses a plurality of magnetic units, each comprising a plurality of permanent magnets and interleaved iron or steel members, as a shock absorber and/or load leveling device. More particularly, this invention relates to a levitated automobile frame using such magnetic units arranged to repel or attract each other, thus to maintain the automobile frame in a position determined by the magnetic units. Still more particularly, this improvement relates to an improved, upwardly-oriented, levitation system using such magnetic units for automotive vehicles.

DESCRIPTION OF THE PRIOR ART

In the applicant's prior copending applications, a solution to a number of problems is offered for using magnetic units for levitating systems. This application, however, is directed to an improvement in the levitation system there disclosed in which a plurality of such basic permanent units are used as a shock absorber for an automotive vehicle. The details of this improvement and modifications to the improvement will be seen from a review of this detailed specification which follows.

BRIEF SUMMARY OF THE INVENTION

It is an overall object of this invention to provide a magnetic unit suitable for use as a shock absorber in an automotive vehicle, which unit uses permanent magnets, such as ceramic or ferrous magnets.

It is another overall object of this invention to provide such a magnetic unit for use as a shock absorber in an automotive vehicle using a plurality of permanent magnets, such as ceramic or ferrous magnets individually using a magnetically permeable material, such as malleable steel or malleable or molded iron, between the magnets, and a plurality of such magnetic units connected together with such magnetically permeable members therebetween.

These and other objects of this invention will become also become apparent from a detailed description of the invention which follows.

A main feature of the invention relates to a magnetic unit comprising a plurality of groups of permanent magnets such as ceramic or ferrous magnets arranged in a side-by-side relationship with like poles facing each other, each plurality being separated from an adjacent plurality by a magnetically permeable member, such as a malleable steel member or a malleable or molded iron member, to focus the lines of magnetic flux. Preferably, each of the ceramic magnets within a group is also separated by an interleaved sheet of malleable steel. Such a plurality of groups of ceramic magnets are secured together and to a supporting member through fastening members, and are separated from the support by a non-magnetic member, such as a non-ferrous plate. A second plurality of groups of permanent magnets, such as ceramic or ferrous magnets, are positioned adjacent to a first plurality of such groups of ceramic magnets with like or opposite poles of the magnets facing each other so that the first and the second pluralities of such groups of magnetics respectively repel or attract one another. Those forces of repulsion or attraction are used to function as a shock absorber for an automotive vehicle.

Another feature of the invention, and a main feature of this improvement application, relates to the use of a magnetic unit of the type comprising a first group of at least a first pair of permanent magnets comprising either ceramic magnets or ferrous magnets having like poles of said permanent magnets positioned adjacent an outer surface of each other; a second group of at least a second pair of permanent magnets comprising either ceramic magnets or ferrous magnets having like poles of said permanent magnets positioned adjacent each other, said first and said second groups of said permanent magnets defining a channel therebetween; at least a third pair of magnetically permeable members comprising malleable steel members, malleable iron members, or molded iron members, one of said third pair being respectively located between said adjacent surfaces of said pair of permanent magnets and located adjacent each outer surface of said pair of permanent magnets; and means for securing said pair of magnetically permeable members and said pair of permanent magnets, thus to provide a magnetic unit which concentrates its magnetic flux through said malleable steel members at opposed locations in said channel; and at least a third permanent magnet located in said channel, a pole of said third magnet being positioned adjacent an opposite magnetic pole of said first pair of permanent magnets at a surface of one of said magnetically permeable members, an opposite pole of said third magnet being positioned adjacent an opposite magnetic pole of said second pair of permanent magnets at a surface of another of said magnetically permeable members, thus to maintain a stable positional relationship by the magnetic effect of the relationship among said first, second, and third permanent magnets, said arrangement being used as a shock absorber or load leveler for an automotive vehicle.

The magnetic unit as described further includes a malleable steel member located between said permanent magnets forming said first and said second pairs of permanent magnets. The magnetic unit further includes a support member for supporting said third permanent magnet in said channel, said support member being secured to a second support member for a portion of the wheel support for said vehicle.

In the magnetic unit as described, the magnetically permeable members located at the outer surfaces of said permanent magnet members are generally L-shaped, while the magnetically permeable member located between a pair of said groups of said magnetic members is generally T-shaped. The magnetic unit has a sufficient plurality of said pairs of said groups of magnets positioned along a right-of-way to cause a vehicle, such as a train, to be levitated for translational motion.

Alternative embodiments of such improvement structures are also disclosed, including stacks of permanent magnets greater than two in number, as are alternate methods of holding the magnets relative to the fixed and movable structures, and alternate suspension structures.

These and other features of the invention will be seen in the detailed description of the invention which follows.

DETAILED DESCRIPTION OF THE PREFERRED EMBODIMENTS

Figure 1:
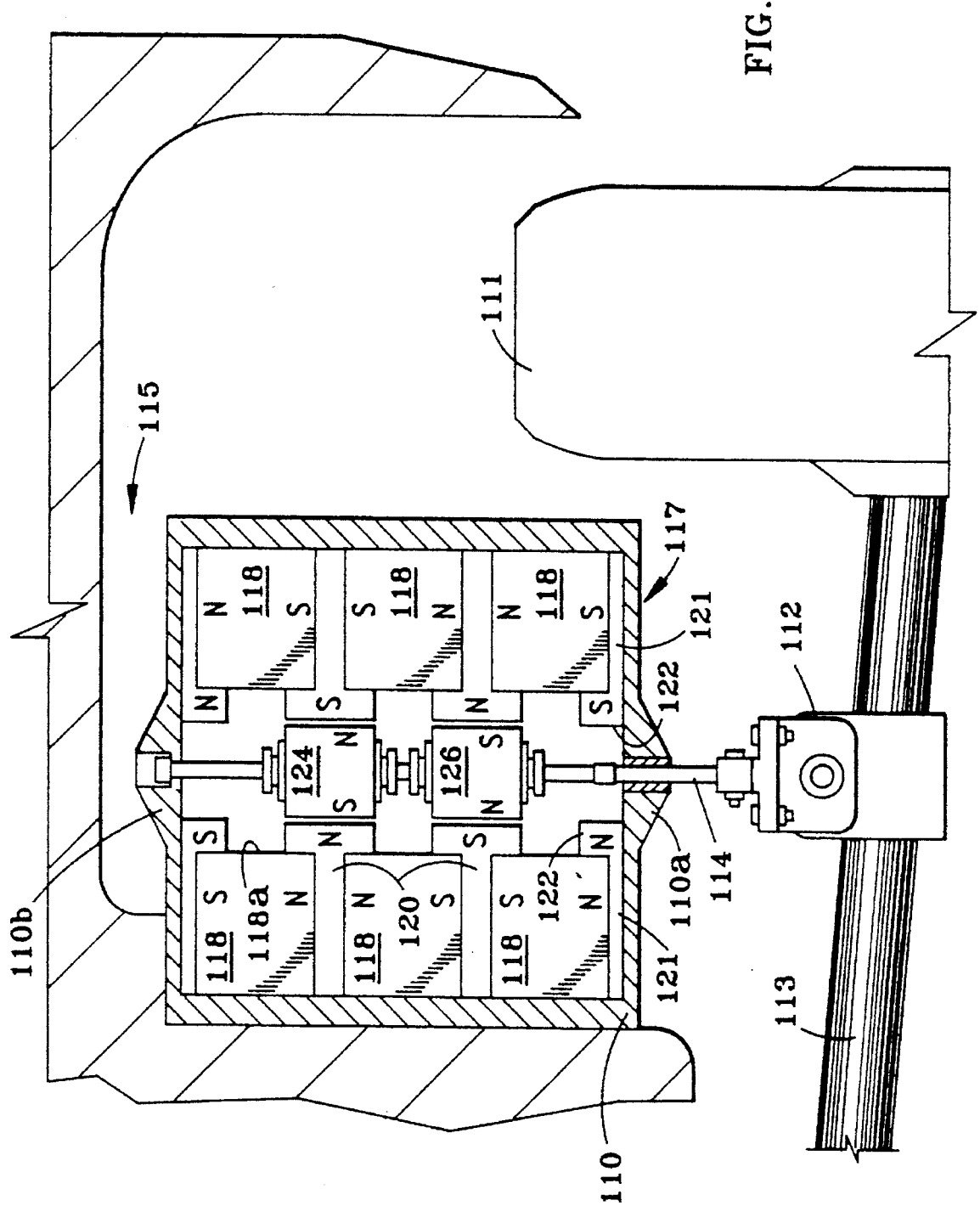
FIG. 1 is a plan view of the magnetic units used as a shock absorber for an automotive vehicle.

Ceramic magnets are readily commercially available and are selected for their magnetic strength and physical sizing from commercial sources. At present, ferrous permanent magnets are preferred because of their greater force capabilities. A suitable ferrous permanent magnet developed by Delco-Remy is known as a Magnequench brand permanent magnet and can attain an effective force of 12 to 14 kilogauss compared to ceramic magnets that can develop a force of 7 to 9 kilogauss. In contrast, the invention develops about 100 kilogauss when using the Magnequench brand permanent magnet and the magnetically permeable members.

FIG. 1 shows an embodiment of a magnetic suspension system according to the invention of this application, which is applied to an automotive vehicle to serve as a shock absorber and/or load leveler.

As seen in FIG. 1, an axle 113 connected to a road wheel 111 has a universal-type joint 112 secured thereto. A support member 114 is secured to the axle 113 and is journaled through spaced-apart plate-like members 110a and 110b for vertical displacement relative thereto. A fixed portion 115 of the magnetic levitation or suspension structure is fixed within a support structure 110. As seen in FIG. 1, the fixed portion 115 comprises a single core suspension system in which a single core 117 is used. If desired, a double core system can be used in which the respective cores 117 are substantially identical. Therefore, only one core needs to be described in detail.

A core 117 comprises at least a pair of vertically aligned permanent magnets, each pair having three permanent magnets 118 as shown. The adjacently-located magnets 118 have their like poles (N,N or S,S) facing each other and the like poles are respectively separated by T-shaped magnetically permeable members 120, such as malleable steel members, malleable iron members, or molded iron members, as described in greater detail above. The bases of the T-shaped members 120 are interleaved between the like poles of the permanent ceramic or ferrous magnets 118. Thus, the head of the T-shaped member 120 lies along a face of 118a of the permanent magnet 118 which is transverse to the pole face adjacent a leg of the T-shaped member. When so positioned, the magnetic pole of the head of the T-shaped member 120 assumes the magnetic polarity of the faces between which the leg of the T-shaped member 120 rests. It should be understood that only three magnets 118 are representatively shown, but a larger number can be used in a linear array like that shown, for example, in FIG. 1. The cores are preferably secured in a suitable container 110 secured to a fixed portion of the vehicle body.

End cap members 121 have a leg adjacent a pole of an adjacent magnet 118 and a head member 122 which is effectively a half of the head of the T-shaped member 118. In effect, therefore, the end cap member is an L-shaped member having a leg 121 and a head 122. A like stack of magnets 118 is spaced from the first stack thus to define a channel therebetween to position such permanent magnets secured to an axle 113 of the vehicle through the joint 112.

Specifically, as seen in FIG. 1, representative permanent magnets 124 and 126 are positioned adjacent to the heads of the T-shaped members 120. The magnet 124 has its S pole positioned adjacent the N pole of the T-shaped member 120 while the magnet 126 has its N pole positioned adjacent to the S pole of the T-shaped member as seen at the left hand stack. Conversely, the N pole of the magnet 124 is positioned adjacent the S pole of the right hand stack of permanent magnets 118 while the S pole of the magnet is positioned adjacent the N pole of the right hand stack of permanent magnets.

The magnets 124 and 126 are secured to the support member 114 fixedly secured by opposed L-shaped flanges 122.

In operation, the magnetic arrangement as shown tends to retain the position shown for slight perturbations in the vertical direction of the support member 114 caused by the axle 113 connected to the wheel 111 either upwardly or downwardly. That is, when the support member 114 tends to rise, the forces of attraction between the adjacently-located opposite poles of the respective magnets 124 and 126 tend to return the structure to the neutral position shown in FIG. 1. When applied to the vehicle suspension system as shown, the magnetic system thus acts as a shock absorber or load leveler. In that respect, therefore, the levitation system is self-adjusting to retain its neutral orientation.

What is claimed is:

1. An automotive vehicle suspension system having a body and an axle (113) which supports a road wheel (111), comprising:

a container (110) secured to a fixed portion of the vehicle body;

a connection member (114) operatively connected with the axle (113) and partially enclosed within said container (110), said connection member (114) being arranged with means (110a, 110a) forming part of said container (110) so as to be guided vertically within said container (110);

a first group of at least a first pair of permanent magnets (118) enclosed within said container (110) and comprising either ceramic magnets or ferrous magnets having like poles of said permanent magnets positioned adjacent an outer surface of each other;

a second group of at least a second pair of permanent magnets (118) enclosed within said container (110) and comprising either ceramic magnets or ferrous magnets having like poles of said permanent magnets positioned adjacent each other, said first and said second groups of said permanent magnets defining a channel therebetween;

at least a third pair of magnetically permeable members (120) enclosed within said container (110) and comprising malleable steel members, malleable iron members, or molded iron members, one of said third pair being respectively located between said adjacent surfaces of said pair of permanent magnets and located adjacent each outer surface of said pair of permanent magnets to concentrate magnetic flux at opposed locations in said channel; and at least a third permanent magnet located in said channel, each pole of said third magnet (124, 126) being positioned adjacent an opposite magnetic pole of said first pair of permanent magnets (118) at a surface of one of said magnetically permeable members (120), thus to maintain a stable positional relationship by the magnetic effect of said first, second, and third permanent magnets on each other, said third permanent magnet (124, 126) being connected to said connection member (114) for movement therewith.

2. A suspension system as set forth in claim 1, wherein the permeable members are a malleable steel member which is located between said permanent magnets forming said first and said second pairs of permanent magnets.

3. A suspension system as set forth in claim 1, wherein a support member connected to said third permanent magnet in said channel is freely vertically movable through a second support member adapted to be secured to a portion of said vehicle.

4. A suspension system as set forth in claim 1, further including at least a pair of said first and said second groups of said permanent magnets forming a pair of said magnetic units, and an additional magnetically permeable member located between said pair of said groups of said permanent magnets.

5. A suspension system as set forth in claim 4, wherein said magnetically permeable members located at the outer surfaces of said permanent magnets are generally L-shaped.

6. A suspension system as set forth in claim 4, wherein said magnetically permeable member located between said pair of said groups of said permanent magnets is generally T-shaped.

7. A suspension system as set forth in claim 4, wherein one of said pair of said groups of said permanent magnets is mounted on a support member whereby attraction or repulsion of said pair contributes to levitating said axle relative to said vehicle.

8. A suspension system as set forth in claim 7, wherein means are provided for controlling a gap between said magnetic units.

9. A vehicle axle supporting system (113) which is connected with a road wheel (111) of the vehicle, comprising:

an increased support member (110) fixed to a portion of the vehicle body;

a first plurality of adjacently-spaced, generally vertically-aligned groups of permanent magnets (118) comprising ceramic magnets or ferrous magnets supported in an elongated face-to-face relationship on said support member (110), said groups of said permanent magnets (118) being arranged to define a channel therebetween and to be separated by magnetically permeable material members (120) which focus lines of flux into the channel;

a second plurality of permanent magnets (124, 126) located in said channel with opposite magnetic poles facing poles on said first plurality of groups of magnetic members (118); and connection means (114) partially enclosed within said support member so as to be guided vertically within said support member, said connection means operatively interconnecting said plurality of permanent magnets (124, 126) located in said channel with the axle.

* * * * *